June 26, 1951 C. E. TACK 2,558,017
MEANS FOR SURFACING WHEELS
Filed Aug. 14, 1947 5 Sheets-Sheet 1

INVENTOR.
Carl E. Tack,
BY Walter S. Schlegel, Jr.
ATTORNEY

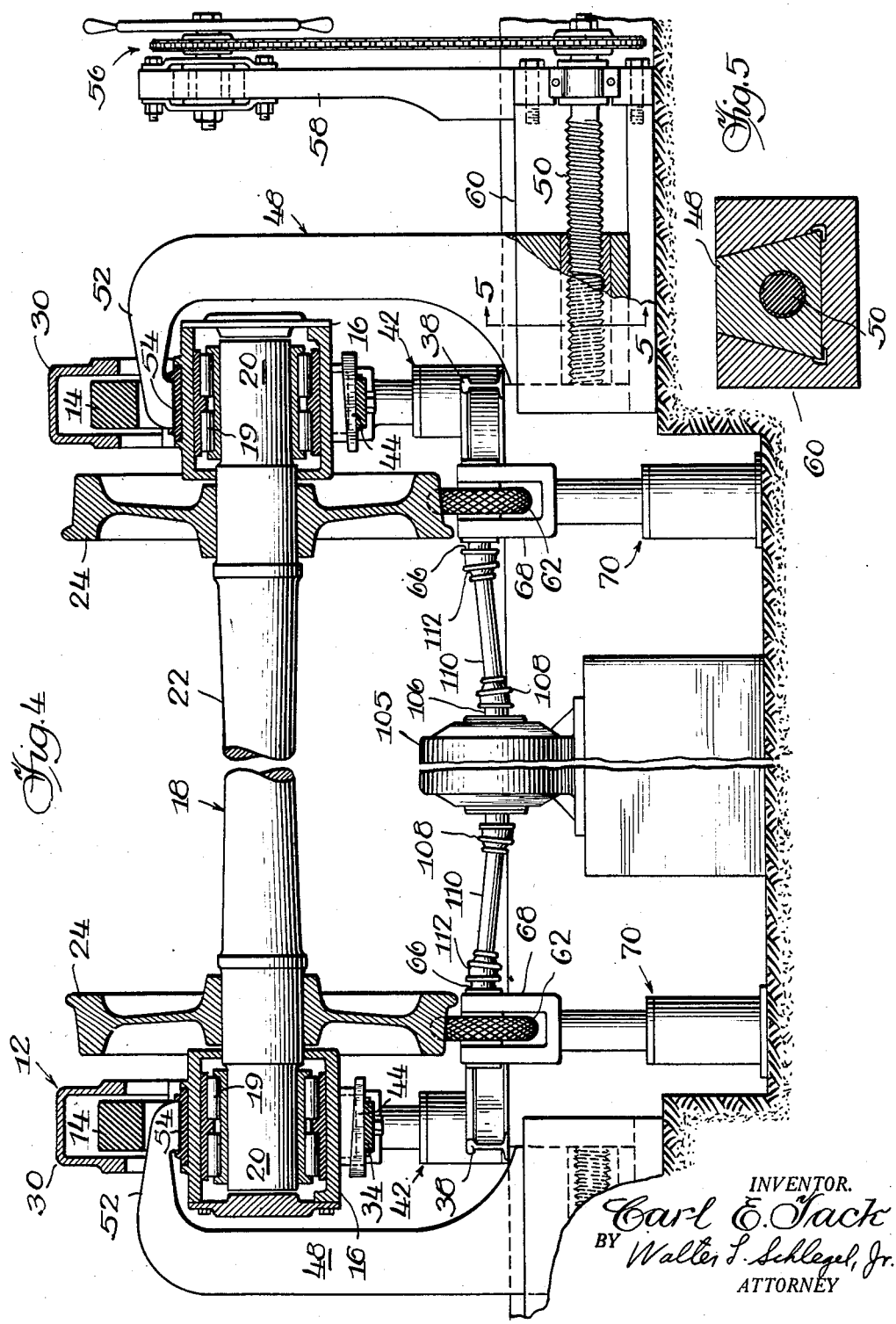

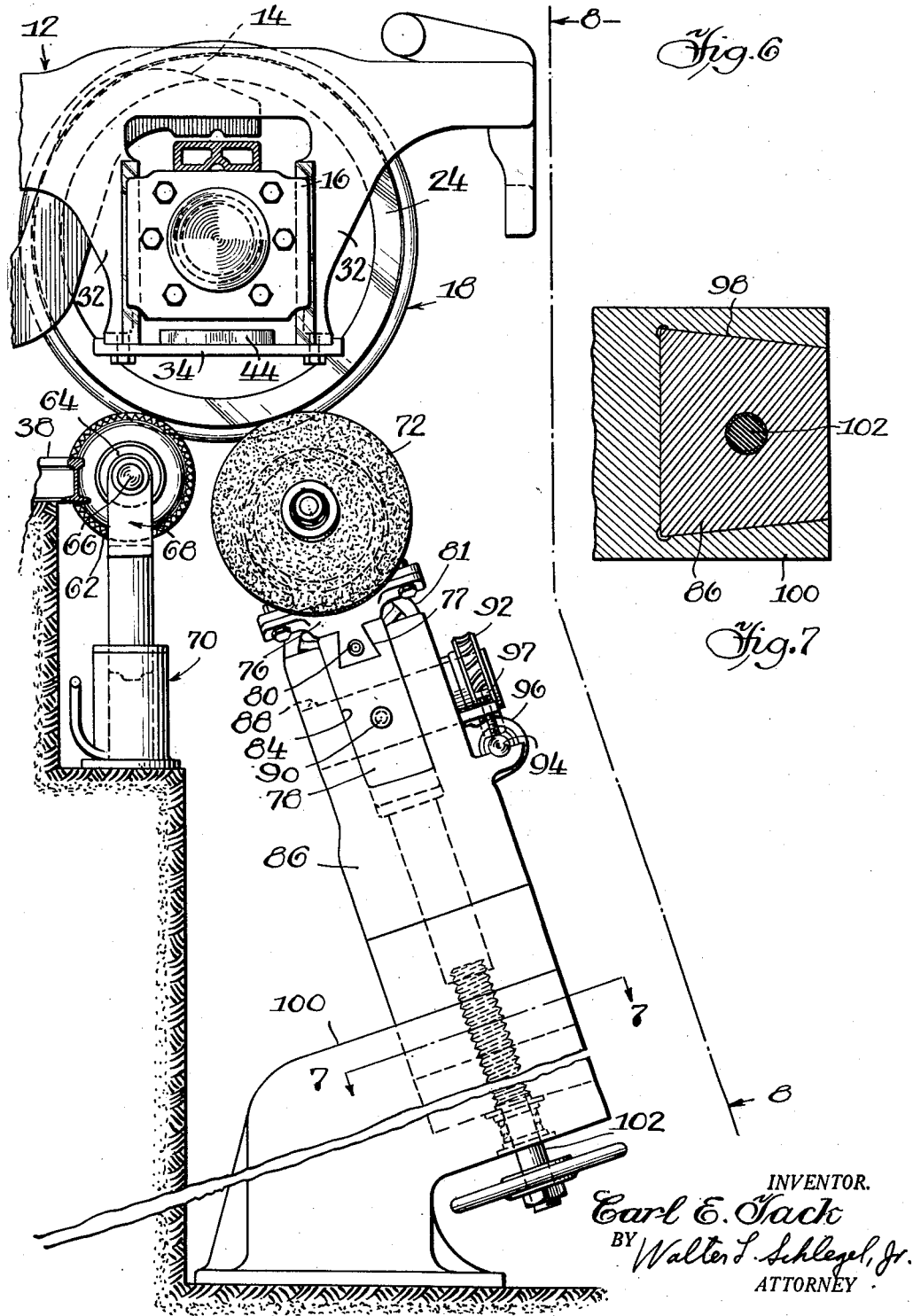

Patented June 26, 1951

2,558,017

UNITED STATES PATENT OFFICE 2,558,017

MEANS FOR SURFACING WHEELS

Carl E. Tack, Chicago, Ill.

Application August 14, 1947, Serial No. 768,623

18 Claims. (Cl. 51—179)

This invention relates to the grinding of wheels and more particularly to a novel means for grinding or abrading the tread surfaces of railway car truck wheels to resurface the same.

A conventional passenger car truck wheel has a rim approximately two and one half inches in radial thickness, and the wheel is condemned when the thickness of the rim is one inch, thus affording one and one half inches of service metal. According to present practice, such a wheel is resurfaced about three times, once every one hundred thousand miles with an average loss of about five sixteenths of an inch of metal at each resurfacing, thereby affording a life of about four hundred thousand miles inasmuch as about nine sixteenths of an inch are worn away in service.

The conventional procedure comprehends complete removal of the wheel and axle assembly from the truck. The axle is then mounted on lathe centers at the ends thereof, and the wheels are turned on a lathe. Thereafter, the wheels are ground to afford a smooth tread surface substantially concentric with the lathe centers.

According to the invention, the wheels and axle are retained in assembled relationship with the truck which is preferably retained in assembled relationship with the car body, and the wheels are ground by a novel pit-type apparatus which is engaged with the under side of the wheels after the truck has been raised from the rails and the rail sections beneath the wheels have been removed. This procedure effects a considerable economy in time, thereby enabling the wheels to be resurfaced by a grinding operation which removes only about one sixteenth of an inch in radial thickness from the wheel tread. Inasmuch as tread metal is currently valued at about six and one half dollars per sixteenth of an inch per pair of wheels, it will be understood that the present invention affords a considerable economy not only in time but in tread metal.

Accordingly, a primary object of the invention is to devise a simple and economical means for resurfacing the tread surfaces of railway wheels without removing the wheels and axles from the truck frame structure and without removing the latter from the car body supported thereby.

Another object of the invention is to devise a novel means for reducing rough riding of railway cars due to eccentricity of the wheel treads with respect to the axle bearings which support the truck structure.

This object is accomplished by supporting the wheels from the axle bearing during the grinding operation, as distinguished from the prior art practice of supporting the wheels from lathe centers at the ends of the axle, which centers are frequently eccentric with respect to the axle bearings.

It may be noted in this connection that due to the great weight of the wheel and axle assembly, distortion of these lathe centers frequently occurs during initial turning of the axle bearings and wheels. This factor, particularly when coupled with slight bending of the axle in service and wear on the wheels and on the axle bearings which support the weight of the car, causes substantial eccentricity of the bearings with respect to the lathe centers, as well as the wheels. Inasmuch as an eccentricity of .016 inch between the wheels and the bearings causes rough riding of the car, it will be understood that grinding wheels of this type from the lathe centers is an extremely unsatisfactory practice. This problem has not heretofore been perceived by those skilled in the art, with the consequence that frequently railway wheel and axle assemblies are initially placed in service with an eccentricity of .010 to .016 inch between wheels and bearings, and are frequently returned to service after resurfacing with much greater eccentricity.

According to the present invention, the wheel and axle assembly is supported by clamping the assembly against the car supporting axle bearing portions. The wheel treads are then ground as the wheels are rotated about said bearings to insure concentricity of the wheels and bearings irrespective of the lathe centers formed in the ends of the axles. In other words, the wheels are resurfaced to concentricity with the rolling axis of the assembly.

The foregoing and other objects and advantages of the invention will become appart from a consideration of the specification and the accompanying drawings wherein:

Figure 4 is a sectional view on the line 4—4 of Figure 3 with the wheel positioning apparatus shown in elevation and portions broken away to simplify the illustration;

Figure 5 is a vertical sectional view through one of the journal box clamping pedestals and actuating mechanism, as indicated by the line 5—5 of Figure 4;

Figure 6 is a fragmentary side elevational view of the truck, with the wheel positioning apparatus shown in section and the grinding mechanism associated with one wheel, as indicated by the line 6—6 of Figure 8;

Figure 7 is a sectional view on the line 7—7 of Figure 6;

Figure 9 is a vertical sectional view through a journal box of a friction type wheel and axle assembly showing a modified construction of the axle clamping mechanism adapted to this type of assembly; and Figure 10 is a sectional view on the line 10—10 of Figure 9.

Figure 1:
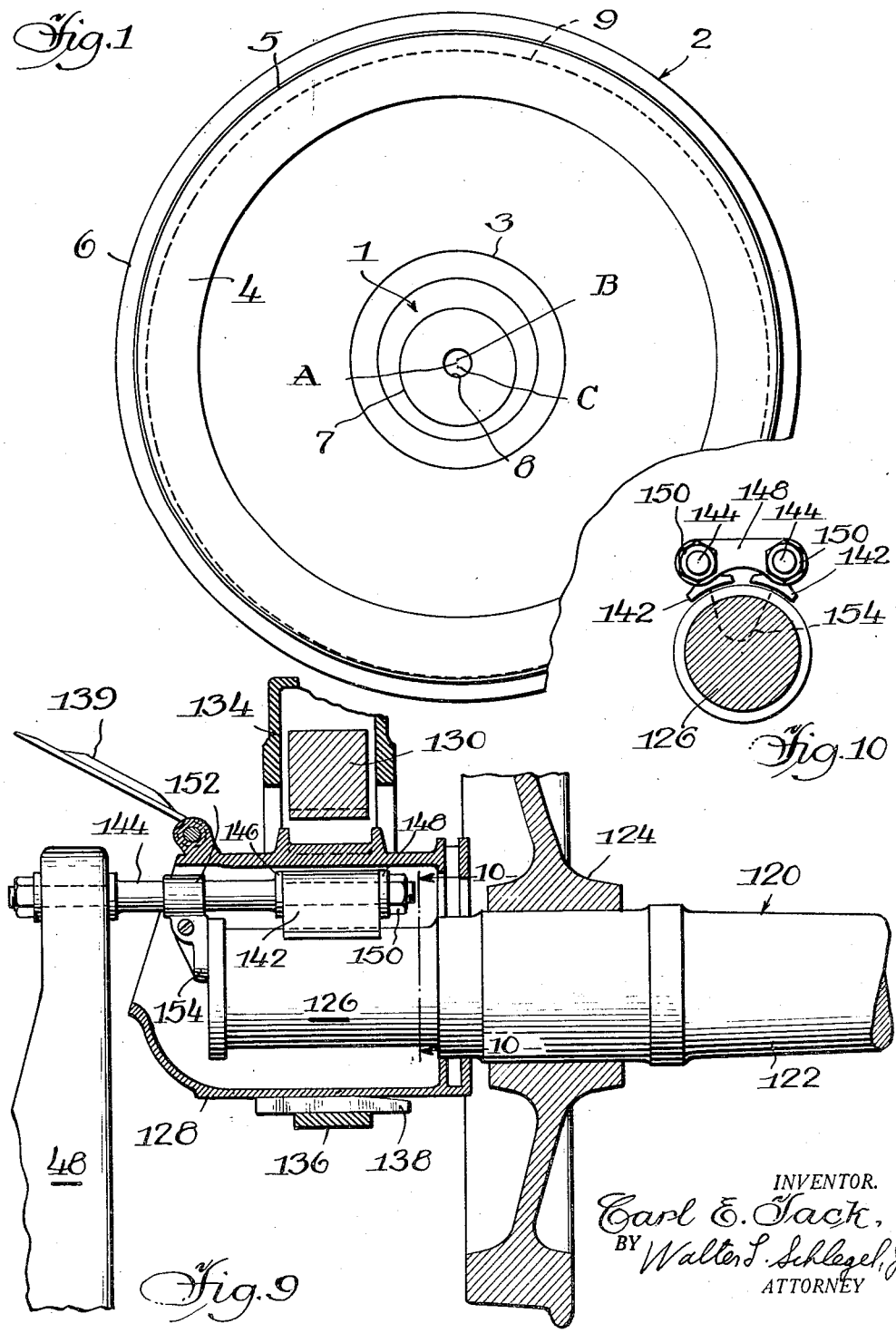
Figure 1 is a diagrammatic end view of a railway wheel and axle unit, illustrating in exaggerated manner the eccentricity between the wheel tread and the axle bearing portion which supports the truck.

Describing the invention in detail and referring to the drawings Figure 1 is a diagrammatic view in end elevation of a railway wheel and axle unit comprising an axle generally designated 1 with a wheel 2 having a hub 3 press-fitted on the axle. The wheel comprises a rim 4 with a tapered tread surface 5 adapted to roll on an associated rail and a flange 6 adapted to engage the inboard side of the rail. The bearing portion 7 of the axle comprises an opening 9 struck from center A and adapted to support the axle as the unit is turned in a lathe during initial frabrication of the unit. It will be noted that the wheel tread 5 is concentric to center B and the bearing portion 7 is concentric to center C, both of these centers being eccentric to center A. These conditions, which are exaggerated in Figure 1 to clarify the illustration, are typical of many wheel and axle units as they are taken from service for resurfacing of the tread 5. However, inasmuch as the tread is turned from center A under present practice, the unit is returned to service with substantial eccentricity between the tread 5 and the axle bearing portion 7 which supports the truck frame, thereby causing rough riding of the truck and excessive wear on the wheels tending to increase the eccentricity thereof and thereby aggravate the rough riding.

According to the present invention the unit is supported by the bearing portion 7 during resurfacing of the tread 5 and thus the wheel is resurfaced substantially from center C, along the dotted line indicated at 9 to insure substantial concentricity between the tread 5 and the bearing portion 7 of the axle.

Referring first to the embodiment of Figures 2–8, a railway car truck fragmentarily indicated at 12 comprises laterally spaced equalizers 14 supported at each end of the truck by conventional roller-type journal boxes 16 at the ends of the wheel and axle assembly 18. The boxes contain roller bearings 19 (Figure 4) engaging the journal or bearing portions 20 of an axle 22 on which wheels 24 are press-fitted. Each equalizer affords support in the usual manner adjacent each end thereof for a spring seat 26 (Figure 2 and 3) carrying springs 28 affording support for a truck frame 30 which in turn supports an associated car body (not shown) by means of a conventional bolster (not shown) extending transversely of the frame 30 and mounted thereon in the customary manner. For simplicity, only one end of the truck is illustrated, inasmuch as the structure is symmetrical about its transverse centerline. It will be understood that the invention may be practiced by grinding the wheels at one end of the truck or by simultaneously grinding the wheels at both ends of the truck, and preferably while the car body (not shown) is in normal assembled relationship with the truck.

The frame 30 comprises a pair of pedestals or legs 32 embracing each journal box 16 and connected by a tie bar 34 adapted to underlie the box and prevent accidental disassembly of the frame therefrom during a bouncing action of the frame such as may occur under service conditions.

The wheels 24 are adapted to roll on rails 36 comprising readily movable hinged sections 38 extending over a pit 40 containing wheel supporting and grinding mechanism hereinafter described.

Figure 2:
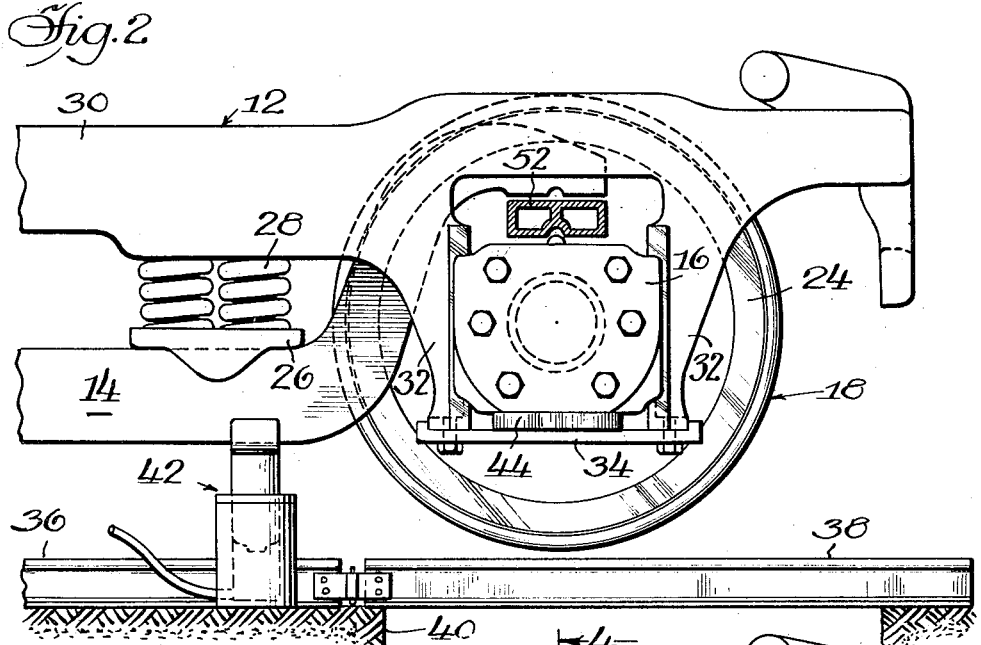
Figure 2 is a fragmentary side view of a conventional railway car truck with the frame structure elevated over a pit to accommodate wheel grinding, and a portion of the novel mechanism shown in section above the journal box of the wheel and axle assembly.

After the truck has been rolled over the pit as shown in Figure 2, the equalizers 14 and the truck frame 30 are elevated by hydraulic jacks 42, until the journal boxes are elevated by wedges 44 preferably inserted between the bars 34 and the boxes to facilitate elevation of the latter by a minimum elevation of the truck frame. If desired the wedges may be eliminated.

When the wheels 24 are elevated from the rail sections 38, pedestals 48 (Figure 4) are moved by threaded adjustor bolts 50 until arms 52 of the pedestals overlie the equalizer seats 54 on the top of the boxes 16.

Each adjustor bolt 50 is actuated by a chain and sprocket device 56 supported by a column 58 on a base or bed 60 having a slidable wedge interlock as best seen in Figure 5 with the lower end of the pedestal 48, thereby affording movement of the latter toward and away from the associated axle bearing box 16.

Figure 3:
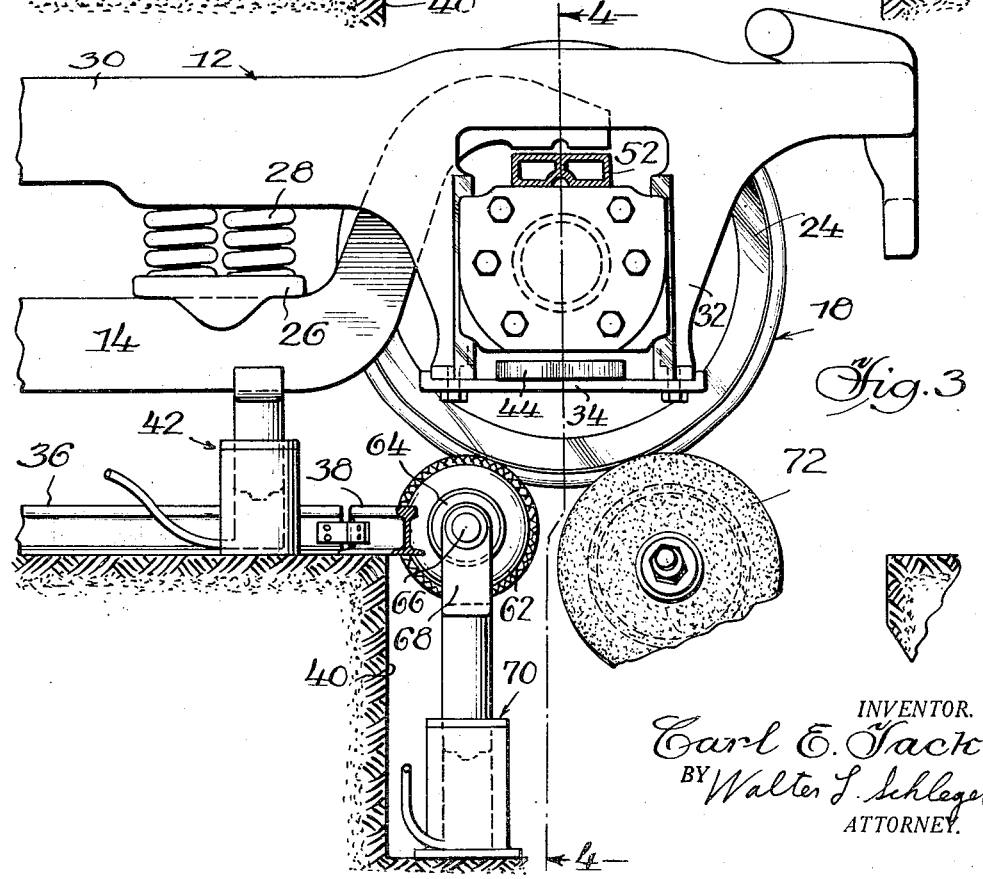
Figure 3 is a view comparable to Figure 2 but showing the movable rail section out of alignment with the wheel to accommodate the wheel clamping roller and grinding wheel which are shown in applied position.

Either before or after the arms 52 are engaged with the upper sides of the bearing boxes 16, the hinged rail sections 38 are swung outwardly from the longitudinal centerline of the truck to positions out of vertical alignment with the wheel treads as best seen in Figures 3 and 4. Then with the arms 52 engaged with the bearing boxes 16, the wheels 24 are engaged by clamping and bearing rollers 62 preferably in the form of pneumatic tires, each supported by a rim 64 mounted on an axle 66, which is journaled within a jaw 68 of an hydraulic jack 70 to accommodate raising and lowering of the associated roller 62. The rollers 62 are elevated until the wheel and axle assembly is tightly clamped between the arms 52 and the rollers 62. Thus the rollers function not only as clamping members but also as bearing members accommodating rotation of the assembly 18. Since the rollers 62, as best seen in Figure 3, support the wheels 24 at one side only of a vertical plane bisecting the wheel and axle assembly axially thereof, it will be apparent that the arms 52 are effective to prevent lateral movement of the assembly, thereby maintaining the wheels in rolling position on the rollers 62. This novel arrangement not only simplifies support of the assembly during abrading of the wheel treads but also makes it possible to provide the compact arrangement which is preferred, but to which the invention is not limited, in which the grinding wheels 72, which are engaged with the underside of the wheels 24, may make their contact with the wheels at the opposite side of said plane.

Figure 8:
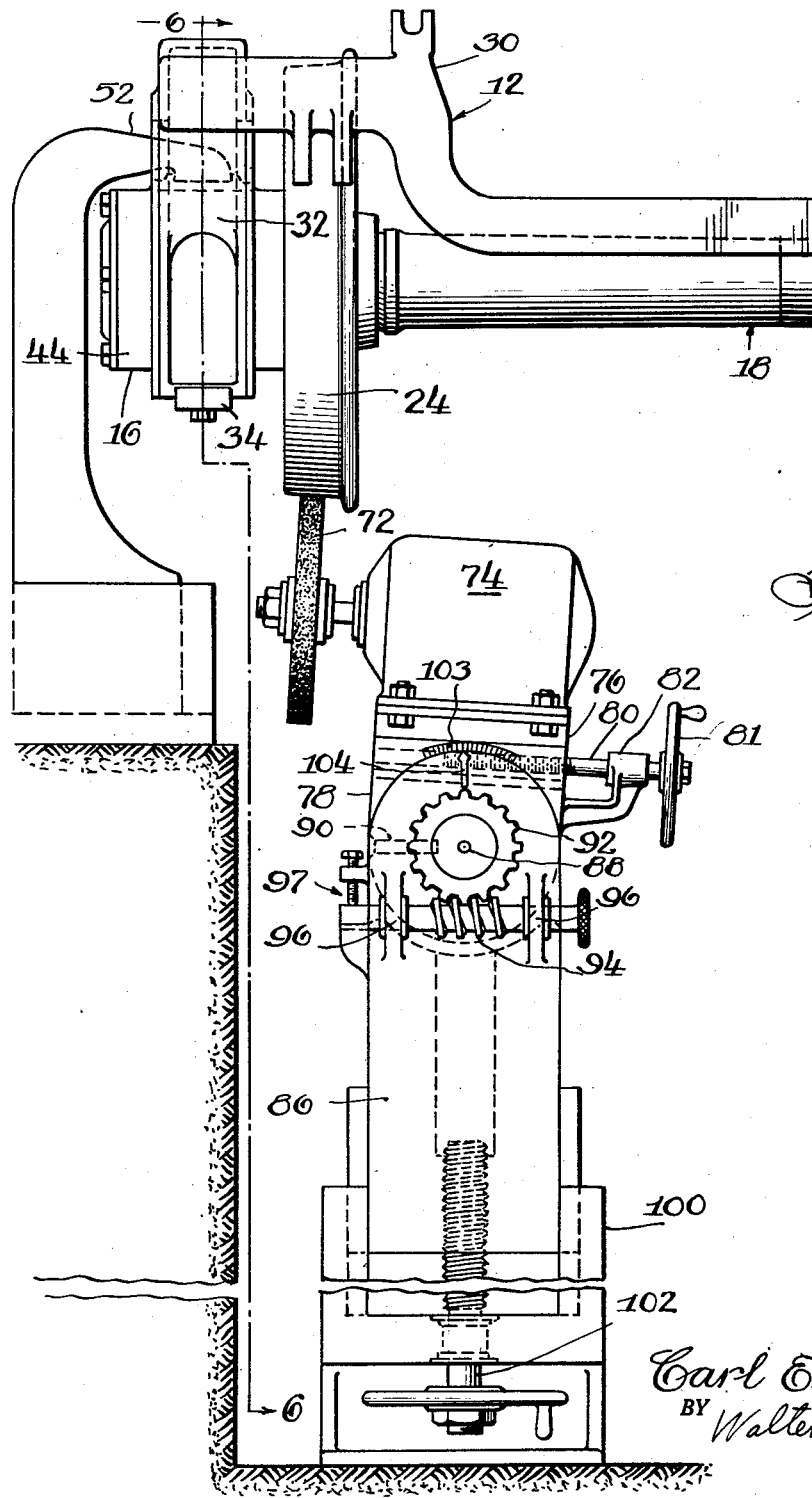
Figure 8 is a fragmentary end view taken on the line 8—8 of Figure 6, showing the truck in fragmentary end elevation and eliminating the wheel support roller to clarify the illustration.

The wheels 24 are then engaged by grinding wheels or discs 72, each actuated by a motor 74 (Figure 8). The motor is mounted on a support plate 76 having tongue and groove engagement at 77 (Figure 6) with a pivotal support bracket 78 and is adjusted relative thereto by a threaded bolt 80 operated by a handle 81 and rotatably mounted but axially interlocked with a bearing arm 82 on the bracket 78. The bracket 78 is received within a jaw 84 (Figure 6) of an adjusting member 86 and is pivoted thereto by a pin 88 keyed at 90 to the bracket 78. The pin 88 is connected to a worm gear 92 operated by a worm 94 mounted in bearings 96 on the member 86 and releasably interlocked therewith by a clamp device 97. The worm is actuated upon release of the device 96 to adjust the grinding wheel 72 to any desired taper of the tread surface of the wheel 24 or to a cylindrical tread surface.

The member 86 is afforded a similar tongue and groove engagement at 98 (Figure 7) with a base 100 supporting an adjustor bolt 102 in threaded engagement with the member 86 to adjust the distance between the perimeter of the grinding wheel 72 and the tread of the wheel 24.

In practicing the invention, after the wheel and axle assembly 18 has been clamped between the arms 52 and the rollers 62, the bracket 78 is adjusted to the desired taper of the wheel 24 as indicated by the protractor scale 103 (Figure 8) on the bracket 78 and the pointer 104 on the member 86; and the bolt 102 is actuated to a point where the slightest contact occurs between the wheel 24 and the rotating grinding wheel 72. At this time, the wheel 24 is rotated by a motor 105 (Figure 4), the armature shaft 106 of which is connected by universal joint couplings 108 to actuator shafts 110 each of which has a universal joint connection at 112 to the axle 66 of one roller 62.

The wheel 24 is then traversed by the grinding wheel 72 by adjustment of the bolt 80, and thereafter the grinding wheel is raised another increment, preferably about .03 inch, and the cycle is repeated until the entire tread of the wheel 24 is ground concentric to the rolling axis of the assembly 18.

It may be noted that if desired, the motor 105 may be connected as by a pulley to the axle 22 for rotation thereof so that the rollers 62 function solely as clamp and bearing means. In such an arrangement, the rollers 62 may be eliminated, and the assembly 18 may be clamped between the arms 52 and the jacks 42.

Figures 9 and 10 show a modified pedestal construction for association with the axle of a friction-type wheel and axle assembly. In these figures, the wheel and axle assembly 120 comprises an axle 122 with a wheel 124 press-fitted thereon, the axle comprising a bearing portion 126 adapted to support a journal box 128 through an associated friction-type bearing mechanism (not shown) of conventional design. In this modification, the journal box 128 is illustrated in its elevated position substantially the same as in Figure 2, and the equalizer 130, the truck frame 134, as well as the tie bar 136 and wedge 138 are also shown in elevated position. This is preferably accomplished in the same manner, as in the previously described embodiment, by a jack (not shown) associated with the equalizer 130.

In Figures 9 and 10, the lid 139 of the journal box is shown in its open position, and the conventional friction-type bearing mechanism has been removed from the box. The modified pedestal 48 has been adjusted inwardly to position two friction bearing shoes 142 above the bearing portion 126 of the axle 122. These shoes are pivotably mounted on rods 144 bolted to the pedestal. Each rod comprises a collar 146 engaging the associated shoe 142, and the rods are connected by a bridge 148 sleeved thereon and secured snugly against the shoes 142 by nuts 150 on the rods 144. The rods are also connected by a similar bridge 152 having a leg 154 engageable with the outboard end of the axle to limit longitudinal movement thereof during the grinding operation, this function being accomplished by the journal boxes in the embodiment of Figures 2–8. It may be noted that the pivotal mounting of the shoes accommodates automatic adjustment thereof to slight variances in the diameter of the bearing portion 126.

It will be understood that as in the previously described embodiment of the invention, the wheel and axle assembly is clamped against the shoes 142 by a roller (not shown) engaging the underside of each wheel, the other portions of the apparatus being eliminated inasmuch as they are substantially identical with those shown in Figures 2–8, except for the modified construction of the pedestal 48.

It will be understood that I do not wish to be limited by the exact embodiment of the device shown which is merely by way of illustration and not limitation, as various and other forms of the device will, of course, be apparent to those skilled in the art, without departing from the spirit of the invention or the scope of the claims.

I claim:

1. Wheel abrading apparatus comprising spaced axle clamp members, wheel clamp rollers beneath respective members, means for raising said rollers to clamp an associated wheel and axle assembly against said members, a rotatable wheel abrader beneath at least one of said members, means for raising and lowering said abrader in a plane diagonal with respect to the vertical, and means for rotating said abrader.

2. Apparatus according to claim 1 wherein means are provided for rotatably adjusting said abrader on an axis substantially perpendicular to said plane.

3. Apparatus according to claim 1 wherein power means are connected to at least one of said rollers for rotating the same.

4. Wheel abrading apparatus comprising spaced arms with downwardly facing surfaces adapted to engage respective journal portions of an associated wheel and axle assembly, wheel supporting rollers below said surfaces, actuating means for thrusting said rollers upwardly against spaced wheels of said assembly to clamp the latter between said rollers and said surfaces, and means for abrading the tread surfaces of said wheels.

5. Apparatus for abrading the wheels of a wheel and axle assembly of a railway car truck having truck structure supported from said assembly; comprising a pit, readily movable rails extending over said pit and adapted to support said assembly, means for elevating said structure from said assembly, means for rotatably supporting the assembly when said rails are moved from supporting relationship therewith, means in said pit for rotating said assembly, wheel abraders in said pit beneath said wheels, and means for elevating said wheel abraders to engage the tread surfaces of said wheels when said rails are moved from beneath the same.

6. Wheel abrading apparatus for a railway wheel and axle assembly having bearing means at the ends thereof adapted to support associated truck structure; comprising spaced clamp members adapted to overlie respective bearing means, bearing means beneath said assembly and movable upwardly to clamp said first-mentioned bearing means against said members, means for raising and lowering the second-mentioned bearing means, means for rotating said assembly, and means for abrading the tread surface of at least one wheel to resurface the same substantially concentric to the rolling axis of said assembly.

7. Wheel abrading apparatus for a wheel and axle assembly having spaced wheels and an axle with journal means outboard respective wheels and formed and arranged to support associated truck structure, said apparatus comprising spaced downwardly facing clamps movable toward and away from each other, means for moving said clamps toward each other to overlie respective journal means, means beneath said assembly for urging said journal means upwardly and clamping the journal means against said clamps, and means for abrading the tread surfaces of the wheels.

8. Apparatus for truing car wheels of a railway wheel and axle assembly, said apparatus comprising spaced wheel abraders, a pair of rails movably supported above respective abraders and readily movably mounted for movement to wheel supporting position above said abraders in vertical alignment therewith and to wheel truing position out of vertical alignment with said abraders, means for jacking said assembly from supported relationship with respect to said rails and for rotatably supporting the wheels above said abraders, means for rotating said assembly, and means for elevating said abraders to engage respective wheels when the rails are in wheel truing position and for lowering said abraders beneath the lower level of said rails to accommodate movement thereof to wheel supporting position after the wheels have been trued by said abraders.

9. In apparatus for truing tread surfaces of spaced wheels mounted on an axle of a wheel and axle assembly; the combination of spaced arms having downwardly facing surfaces adapted to engage respective journal ends of said assembly, wheel supporting rollers below said surfaces constructed and arranged to afford resilient support for said wheels, means for urging said rollers upwardly to positively clamp said journal ends against said arm surfaces, and rotatable means for abrading the tread surfaces.

10. Wheel truing apparatus comprising spaced arms with downwardly facing surfaces adapted to engage complementary roller bearing box surfaces of an associated wheel and axle assembly, means affording a resilient rolling support for wheels of said assembly, means for thrusting said first-mentioned means upwardly against said wheels to clamp said box surfaces against said arm surfaces, and means for abrading the tread surfaces of said wheels.

11. Wheel abrading apparatus comprising spaced arms with downwardly facing arcuate bearings adapted to engage complementary arcuate surfaces of an associated axle, wheel supporting rollers below said surfaces and adapted to afford a resilient rolling support for wheels on said axle, actuating means for thrusting said rollers upwardly against said wheels to clamp said axle surfaces against said arm surfaces, and means for abrading the tread surfaces of said wheels.

12. In an apparatus for truing spaced wheels on an axle of a wheel and axle assembly on a railway car truck; the combination of a pit, rails extending across said pit, said rails being movable to and from wheel supporting position beneath the wheels, rollers in said pit beneath the level of said rails, means for raising the rollers to support respective wheels at points disposed at one side only of a vertical plane bisecting said assembly longitudinally thereof, said wheels being unsupported at the opposite side of said plane, means for holding said assembly against movement laterally thereof to maintain said wheels in contact with said rollers at said points, abraders in said pit beneath the level of said rails, and means for raising said abraders to engage the underside of said wheels at said opposite side only of said plane when the wheels are supported by the rollers.

13. In apparatus for truing the tread surfaces of spaced wheels of a wheel and axle assembly; the combination of a pair of rails movably supported for movement to wheel supporting position in vertical alignment with respective wheels and to wheel truing position out of vertical alignment with respective wheels, means for jacking said assembly to lift said wheels from said rails, a pair of rollers mounted beneath the level of said rails, means for raising said rollers to engage said wheels when said rails are in wheel truing position, said rollers supporting the weight of said assembly when engaged with said wheels, abraders supported beneath the level of respective rails, and means for adjustably moving said abraders upwardly to engage said wheels when the rails are in wheel truing position, said abraders engaging the wheels at one side only of a vertical plane bisecting said assembly longitudinally thereof, and said rollers engaging the wheels at the other side only of said plane, the rotational axes of said abraders being fixed against substantial movement with respect to the rotational axes of said rollers in any adjusted position of said abraders when the wheels are supported by said rollers.

14. In apparatus for truing spaced wheels on an axle of a wheel and axle assembly mounted in a railway car truck; the combination of rollers supporting respective wheels at points disposed at one side only of a vertical plane bisecting said assembly longitudinally thereof, means for holding said assembly against movement laterally thereof to maintain said wheels in contact with said rollers at said points, abraders engaged with respective wheels at points disposed at the opposite side only of said plane, means for adjustably positioning said abraders toward and away from said wheels, and means for rotating said abraders, the rotational axes of said abraders being fixed with respect to the rotational axes of said rollers in any adjusted position of said abraders.

15. In an apparatus for truing tread surfaces of spaced metal wheels on an axle of a wheel and axle assembly in a railway car truck; the combination of rollers supporting respective wheels at one side only of a vertical plane bisecting said assembly longitudinally thereof, said wheels being unsupported at the opposite side of said plane, means preventing movement of said assembly laterally thereof to maintain said wheels in supported relationship with said rollers at said side only of said plane, and means for removing wheel metal from said surfaces at the underside of said wheels.

16. In an apparatus for truing the tread surfaces of spaced wheels on an axle of a wheel and axle assembly of a railway car truck; the combination of rollers, means positioning said rollers at a wheel supporting position whereat said rollers are engageable with respective wheels at one side only of a vertical plane bisecting said assembly longitudinally thereof, means spaced from said wheels for holding said assembly from movement laterally thereof to maintain said wheels in contact with said rollers at said side only of said plane, readily movable rail sections movably mounted for movement to and from wheel supporting position beneath said surfaces of said wheels, means for rotating at least one roller and thereby rotating said assembly, an abrader beneath the level of at least one rail section, and means for elevating said abrader to engage the related wheel surface when said rail section has been moved from wheel supporting position.

17. In an apparatus for truing tread surfaces of spaced wheels of a railway wheel and axle assembly in a railway car truck; the combination of a pair of readily movable rail sections movably mounted for movement to and from wheel supporting position beneath respective wheels, at least one wheel abrader beneath the level of said sections, means independent of said sections for rotatably supporting the wheels above said abrader, said means comprising rollers engageable with respective wheels at one side only of a vertical plane bisecting said assembly longitudinally thereof, means for raising and lowering the rollers, and means spaced from said surfaces for holding said assembly against movement laterally thereof to maintain said wheels in contact with said rollers at said side of said plane, motor means for rotating at least one roller and thereby rotating said assembly, and means for elevating said abrader to wheel abrading position against the underside of the related wheel surface when the related rail section is out of wheel supporting position and for lowering said abrader beneath the level of said rail sections to accommodate movement thereof to and from wheel supporting position.

18. In an apparatus for truing spaced wheels on an axle of a wheel and axle assembly of a railway car truck; the combination of a pair of rail sections readily movably mounted for movement to and from wheel supporting position beneath the wheels, wheel supporting rollers, means for raising said rollers to afford support for respective wheels, means for holding said assembly against movement laterally thereof to maintain said wheels in contact with said rollers, abraders beneath the level of said rail sections, and means for raising said abraders to engage the underside of said wheels when said wheels are supported by said rollers and said rail sections are out of wheel supporting position, and a motor having an operative connection to at least one roller for rotating the same and thereby rotating said assembly when said abraders are engaged with the underside of said wheels, said operative connection comprising means for accommodating raising of said roller.

CARL E. TACK.

REFERENCES CITED

The following references are of record in the file of this patent:

UNITED STATES PATENTS

| Number | Name | Date |
|---|---|---|
| 449,350 | Elder | Mar. 31, 1891 |
| 573,694 | Pedrick | Dec. 22, 1896 |
| 1,136,124 | Griffin et al. | Apr. 20, 1915 |
| 1,607,979 | Cooney | Nov. 23, 1926 |
| 1,627,074 | Blair et al. | May 3, 1927 |
| 1,748,585 | Reed et al. | Feb. 25, 1930 |
| 2,215,403 | McGowan | Sept. 17, 1940 |